United States Patent [19]

Haga et al.

[11] Patent Number: 4,852,428
[45] Date of Patent: Aug. 1, 1989

[54] INDEXING DEVICE

[75] Inventors: Katutoshi Haga; Hisatoshi Yoshida; Yushi Mitani, all of Toyota, Japan

[73] Assignee: Fujii Seiko Limited, Japan

[21] Appl. No.: 210,518

[22] PCT Filed: Oct. 22, 1987

[86] PCT No.: PCT/JP87/00809
§ 371 Date: Jun. 13, 1988
§ 102(e) Date: Jun. 13, 1988

[30] Foreign Application Priority Data

Oct. 22, 1986 [JP] Japan .................................. 61-251276
Oct. 22, 1986 [JP] Japan .................................. 61-161717

[51] Int. Cl.⁴ .......................................... B23Q 16/02
[52] U.S. Cl. ................................ 74/826; 74/813 L; 74/813 L
[58] Field of Search ................ 74/813 R, 813 L, 826, 78/816, 526; 192/139, 149; 82/36 A

[56] References Cited

U.S. PATENT DOCUMENTS 3,798,721  3/1974  Schalles ........................... 82/36 A X
4,507,993  4/1985  Silverman ......................... 74/826 X
4,640,159  2/1987  Stojanovski ....................... 74/826 X

FOREIGN PATENT DOCUMENTS 2613260  10/1976  Fed. Rep. of Germany ..... 82/36 A
50-5075    6/1975  Japan .
192443   10/1984  Japan .
1093411   3/1983  U.S.S.R. .......................... 82/36 A Primary Examiner—Rodney M. Lindsey
Assistant Examiner—Flemming Saether
Attorney, Agent, or Firm—Oliff & Berridge

[57] ABSTRACT

An indexing device wherein a rotary member which is supported by a support member such that the rotary member is rotatable about its axis and axially movable between a first position thereof and a second position thereof is rotated by a rotational drive mechanism having a one-way clutch, in increments of a predetermined angle, and wherein the rotary member is prevented by a stopper mechanism from being rotated past the predetermined angle due to inertia while being placed in the first position, and is precisely positioned by a positioning mechanism while being placed in the second position.

6 Claims, 5 Drawing Sheets

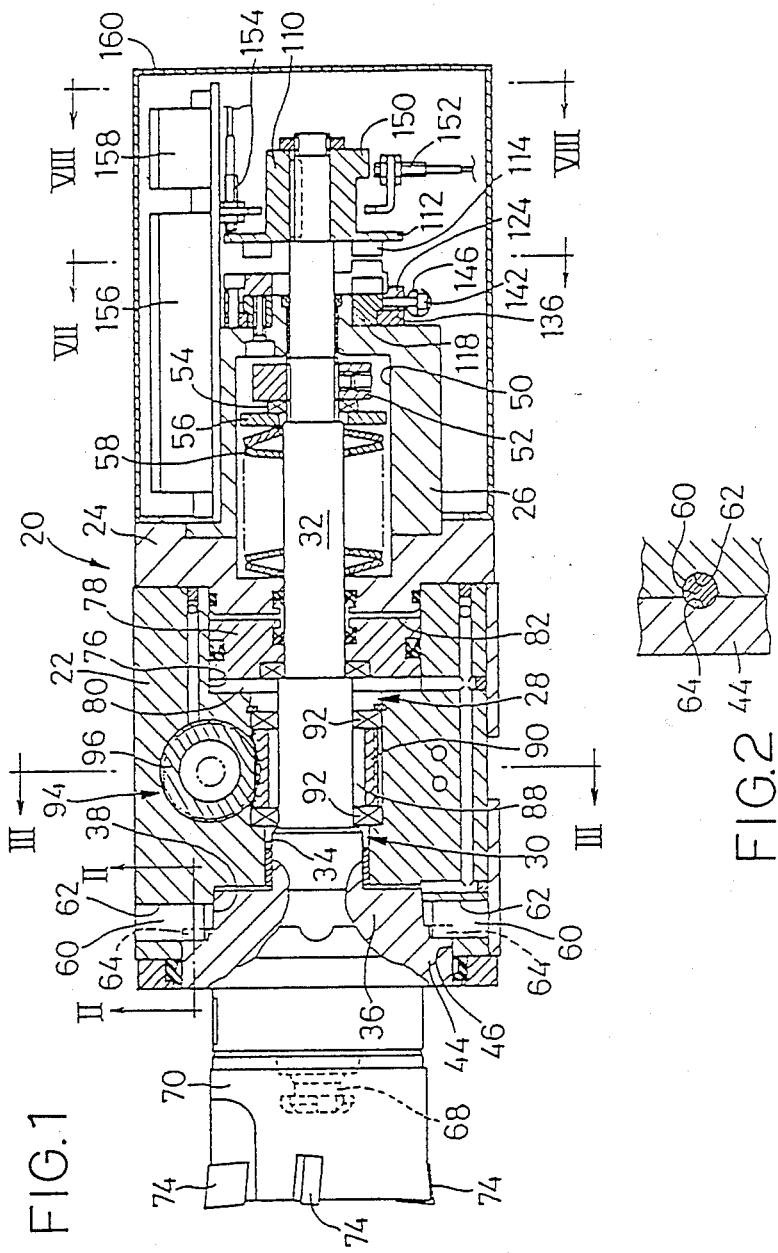

INDEXING DEVICE

BACKGROUND OF THE INVENTION

1. Field of the Invention

The present invention relates to an indexing device in which a rotary member is rotated in steps by a predetermined angle for indexing thereof at a plurality of positions, and more particularly to such an indexing device which is suitably used as a tool indexing device, for example.

2. Prior Art

A known indexing device includes a rotary member, an axial drive mechanism, and a rotational drive mechanism. The rotary member is supported by a support member such that the rotary member is rotatable about its axis and axially movable between a first position and a second position. The axial drive mechanism operates to move the rotary member in an axial direction, while tee rotational drive mechanism having a one-way clutch operates to rotate the rotary member only in one direction (referred to as "forward direction"). In such an indexing device, the rotary member is rotated by the rotational drive mechanism in increments of a predetermined angle, after the rotary member is moved to the first position by the axial drive mechanism.

An example of such an indexing device in the form of a tool indexing device is disclosed in Publication No. 60-134536 of unexamined Japanese Utility Model Application. This tool indexing device has a body to which an adapter is attached such that the adapter is rotatable about its rotating axis and movable along the rotating axis between a retracted position and an advanced position. To the adapter, there is removably attached a tool holder which holds four cutting tools at equally spaced-apart angular positions of a circle having a center on the rotating axis of the adapter. While the adapter is fixed to the body in its retracted position, the tool indexing device performs cutting operations. Where one cutting tool is changed to another, the adapter is moved to its advanced position by the axial drive mechanism, and then rotated by the rotational drive mechanism by a predetermined incremental angle. The predetermined angle corresponds to a circumferential distance by which two adjacent cutting tools are spaced apart from each other. The rotational drive mechanism includes the one-way clutch so that the adapter is rotated only in the forward direction, whereby the four cutting tools are successively located in the operative position in order to perform the cutting operation on a workpiece.

In the above indexing device, since the rotation of the adapter in the forward direction with respect to the rotational drive mechanism is allowed by the one-way clutch, and there is provided no stopper means for inhibiting a further rotation of the adapter at a predetermined circumferential position, the adapter is rotated past the predetermined circumferential position due to inertia, whereby the appropriate cutting tool is displaced from the operative position. In this case, the circumferential position of the adapter can be adjusted by rotating the adapter such that the desired cutting tool is brought into the operative position. However, it is impossible to adjust the position of the adapter by rotating the same in the reverse direction, owing to the one-way clutch which permits the adapter to be rotated only in the forward direction. Therefore, it is necessary to rotate the adapter in the forward direction approximately by 360 degrees so as to adjust the circumferential position of the adapter. Such an adjustment is cumbersome and time-consuming.

Where the adapter is indexable at four circumferential positions by a positioning mechanism while being held in its retracted position, the positioning mechanism is inoperable when the adapter is rotated past a predetermined position, whereby the adapter cannot be restored to its retracted position.

The above indexing device suffers from another problem that it is difficult to fabricate the positioning mechanism for positioning the adapter when it is placed in its retracted position.

It has been proposed to provide a positioning mechanism which is constituted by two tapered grooves formed in the body of the indexing device and corresponding tapered keys provided on the adapter. The two tapered grooves intersect at right angles and each of the grooves has side walls which are spaced apart from each other by a distance which decreases toward the bottom of the groove. These tapered grooves and keys are difficult to form with high accuracy, resulting in increasing the cost of manufacture.

The above problems are not limited to the tool indexing device described above, but the same problems may be generally encountered in other types of indexing devices wherein the rotary member is rotated by a predetermined incremental angle, and indexed at a plurality of positions.

SUMMARY OF THE INVENTION

The present invention was made in the light of the above situations. It is therefore one object of this invention to provide an indexing device having a stopper mechanism for preventing the rotary member from being rotated past a predetermined or nominal position due to inertia.

Another object of the present invention is to provide a positioning mechanism which is capable of positioning the rotary member in a precise manner when the rotary member is placed in its retracted position, and which is available at a reduced cost.

A further object of the present invention is to provide a tool indexing device having the above-indicated stopper mechanism and positioning mechanism, which device is precisely operated and available at a reduced cost.

According to the present invention, there is provided an indexing device including (a) a support member, (b) a rotary member, (c) an axial drive mechanism, (d) a rotational drive mechanism, wherein an intermediate member is provided between the support member and the rotary member so that the intermediate member is rotatable about the axis of the rotary member relative to the rotary member and the support member, and is biased by a spring member in a direction opposite to a rotating direction of the rotary member, one of the intermediate member and the rotary member being provided with a plurality of first engaging portions which are equally spaced apart from each other on a circle having a center on the axis of the rotary member, at angular intervals corresponding to the predetermined angle by which the rotary member is rotated, the other of the intermediate member and the rotary member being provided with at least one second engaging portion which engages one of the first engaging portions when the rotary member is placed in the first position, and which is disengaged from the first engaging portions when the rotary member is placed in the second position, and wherein the support member and the intermediate member are provided with respective stopper portions, which abut on each other to prevent rotations of the intermediate member and the rotary member when a sum of a rotating angle of the rotary member before engagement of the first engaging portion and the second engaging portion and a rotating angle of concurrent rotations of the rotary member and the intermediate member as a unit after the engagement amounts to the predetermined angle by which the rotary member is rotated.

In the thus constructed indexing device, the first and second engaging portions are engaged with each other when the rotary member is rotated after the rotary member is moved from the second position to the first position. Following this engagement of the first and second engaging portions, the intermediate member is rotated against a biasing force of the spring member. The rotation of the rotary member is stopped when the stopper portion of the intermediate member abuts on the stopper portion of the support member, whereby the rotary member is precisely stopped at a position after the rotary member is rotated by the predetermined angle.

Subsequently, the rotary member is restored to the second position, and then the engagement of the first and second engaging portions are released. At the same time, the intermediate member is returned to its original position by the biasing force of the spring member. Since the rotary member is restored to the second position while being held in the position to which the rotary member is rotated by the predetermined angle, an angular phase of the first engaging portions and that of the second engaging portions are shifted from each other by an angle equal to the above predetermined angle. When the rotary member is rotated in the next indexing operation, therefore, a combination of the first engaging portions and the second engaging portions which engage with each other is different from that in the preceding indexing operation.

In the above-described indexing device according to the present invention, the rotary member is precisely stopped in place after the rotary member is rotated by the predetermined angle, thereby preventing an excessive angle of rotation of the adapter due to inertia.

In this arrangement, the first and second engaging portions of the stopper mechanism are engaged with or disengaged from each other, making use of the movement of the rotary member between the first and second positions. Further, the intermediate member is returned to its original position under the biasing force of the spring member. Accordingly, the present indexing device does not require a specific actuator for operating the stopper mechanism and a control device for the actuator, and therefore economical in manufacture.

In accordance with the present invention, there is provided an indexing device having a positioning mechanism, other than the above-described indexing device with a stopper mechanism. The positioning mechanism includes at least one positioning pin which is circular in cross section and is fixed in one of the support member and the rotary member in a direction perpendicular to the rotating axis of the rotary member such that a portion of the above-indicated at least one positioning pin interferes with the other of the support member and the rotary member, and a plurality of recessed portions which are formed in a portion of the other of the support member and the rotary member which portion interferes with the portion of the positioning pin, for engaging the portion of the positioning pin when the rotary member is moved to the retracted position at one of the plurality of equally spaced-apart angular positions.

This positioning mechanism may be employed in an indexing device having a stopper mechanism other than the stopper mechanism of the indexing device previously described, or in an indexing device without a stopper mechanism.

Further, the present invention provides an improved tool indexing device wherein the rotary member of each of the above indexing devices is an adapter which removably supports a tool holder, and the support member is a body of the tool indexing device. The tool indexing device is adapted such that the selected one of a plurality of cutting tools held by the tool holder is brought into its operative position when the adapter is rotated in increments of a predetermined angle.

BRIEF DESCRIPTION OF THE DRAWINGS

FIG. 1 is a front elevational view in cross section showing a tool indexing device according to one embodiment of the present invention.

FIGS. 2 and 3 are cross sectional views taken along lines II—II and III—III of FIG. 1, respectively.

DETAILED DESCRIPTION OF PREFERRED EMBODIMENTS

Figure 3:
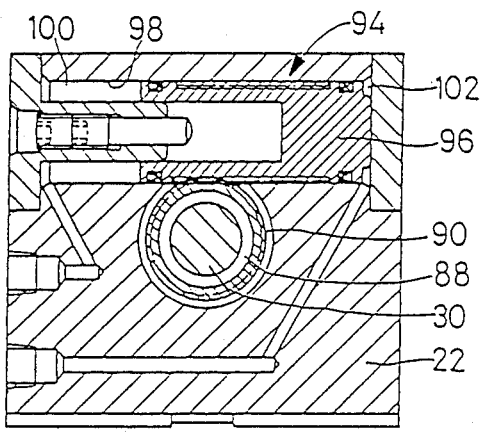

There will be described in detail a preferred embodiment in the form of a tool indexing device, referring to the drawings.

Figure 9:
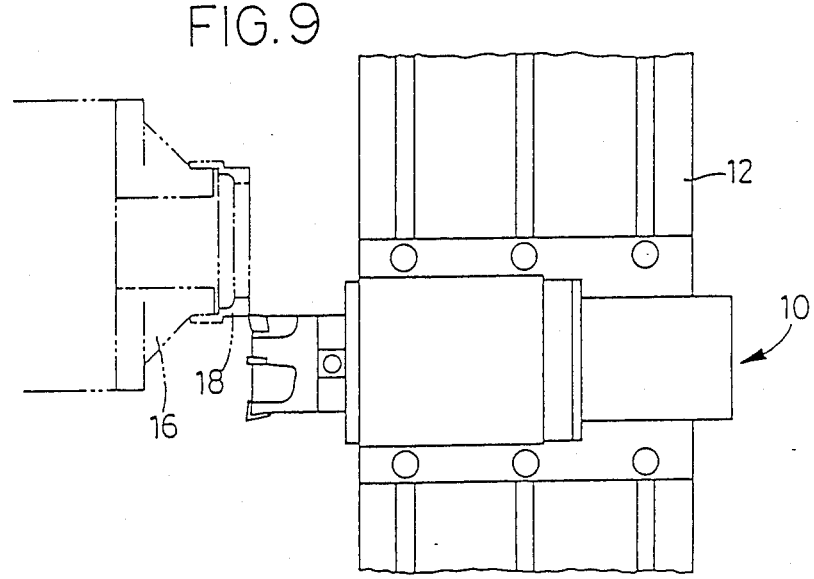
FIG. 9 is a plan view showing the tool indexing device which is set on a slide of a machine tool so as to perform a cutting operation on a workpiece.

Referring to FIG. 9, reference numeral 10 generally indicates a tool indexing device (hereinafter referred to simply as "indexing device") of the embodiment according to the present invention. The tool indexing device is fixed to a slide 12. The slide 12 is adapted to be moved by drive means (not shown) in two mutually perpendicular directions. The indexing device 10 is used for performing cutting operations on a workpiece 18 held at a suitable position by a chuck 16.

The indexing device 10 is shown in detail in FIG. 1. In the figure, reference numeral 20 designates a body of the indexing device 10. The body 20 consists of a plurality of components including a first block 22, a second block 24, and a third block 26, which are fixed as a unit. The components of the body 20 define a stepped bore 28 which extends in the axial direction of the body 20. A stepped adapter 30 is rotatably and axially movably fitted in the bore 28. In the instant embodiment, the adapter 30 constitutes a rotary member, and the body 20 serves as a support member for supporting the rotary member. The adapter 30 has a small-diameter portion 32 and a large-diameter portion 36 which are fitted in corresponding small-diameter portion 34 and large-diameter portion 38 of the bore 28. The large-diameter portion 38 is formed at the open end of the small-diameter portion 34. The large-diameter portion 36 of the adapter 30 has a tapered outer circumferential surface whose diameter gradually decreases toward the small-diameter portion 32 thereof in the axial direction of the adapter 30. On the other hand, the large-diameter portion 38 of the bore 28 has an inner surface which follows the tapered outer circumferential surface of the large-diameter portion 36 of the adapter 30. Thus, the large-diameter portion 36 of the adapter 30 is press-fitted in the corresponding portion 38 of the bore 28.

Adjacent to the large-diameter portion 36, the adapter 30 has a flange 44 which extends radially outwardly from one end of the portion 36 protruding from the large-diameter portion 38 of the bore 28. The flange 44 is fitted in an opening 46 which is formed at the open end of the large-diameter portion 38 of the bore 28 and has a larger diameter than the portion 38. The third block 26 defines a cylindrical chamber 50 which has a larger diameter than the bore 28. A nut 52 is threaded on a portion of the adapter 30 which is accommodated within the chamber 50. Between the nut 52 and one end of the chamber 50 defined by the second block 24, there are disposed a thrust bearing 54, a spacer 56, and coned-disc springs 58. The adapter 30 is biased by the coned-disc springs 58 toward its retracted position, that is, in the direction in which the adapter 30 is moved into the body 20. Therefore, the large-diameter portion 36 of the adapter 30 is press-fitted in the corresponding portion 38 of the bore 28, while the flange 44 of the adapter 30 abuts on the bottom of the opening 46 of the bore 28. Thus, the adapter 30 in its retracted position (in the second position) is precisely positioned in the body 20.

The first block 22 has two stepped portions which have different inner diameters and define the large-diameter portion 38 and the opening 46 of the bore 28, respectively. Four positioning pins 60 are fixed in the first block 22 at its equally spaced-apart angular positions. More specifically, these pins 60 are inserted into the first block 22 in the direction perpendicular to the rotating axis of the adapter 30, while striding over the adjacent parts of these two stepped portions of the first block 22. These pins 60 are circular in cross section, and are hardened. The first block 22 is provided with holes 62, which are precisely formed by a jig-boring machine. The pins 60 are press-fitted in the corresponding holes 62, so that the axis of each of the pins 60 lies in the large-diameter portion 38 of the bore 28 One end portion of each pin 60 nearer to the axis of the first block 22 has a segment protruding into the opening 46 which is located ahead of the axis of the pin 60. On the other hand, the large-diameter portion 36 of the adapter 30 has four recessed portions 64 at equally spaced-apart angular positions. Each recessed portion has a shape corresponding to that of the segment which protrudes in the opening 46, as shown in FIG. 2. These recessed portions 64 are rough cut by an end mill, hardened by carburization, and ground by a grinding machine. When the adapter 30 is fitted in the bore 28 and located in its retracted position, each of the recessed portions 64 of the large-diameter portion 36 of the adapter 30 is brought into engagement with corresponding positioning pin 60. Thus, the adapter 30 is positioned in the body 20 such that the adapter 30 is not rotatable with respect to the body 20. In the instant embodiment, the positioning pins 60, the recessed portions 64 of the adapter 30 and other components constitute a positioning mechanism.

To one end portion of the adapter 30, a tool holder 70 is removably attached by a clamper 68. The clamper 68 has a corolla-shaped head, while the tool holder 70 has an engagement hole which engages the head of the clamper 68. When the clamper 68 is pulled inward of the adapter 30 by a pull-in mechanism (not shown), with the head of the clamper 68 held in engagement with the engagement hole of the tool holder 70, the tool holder 70 is fixed to the adapter 30 such that the tool holder 70 is immovable relative to the adapter 30. The tool holder 70 is provided with four cutting tools 74 which are disposed at equally spaced-apart angular positions of a circle having a center on the rotating axis of the adapter 30. When the adapter 30 is located in its retracted position by said positioning mechanism, one of the cutting tools 74 is disposed in the operative position suitable for machining the workpiece 18. The cutting tools 74 are successively brought into the operative position, when the adapter 30 is rotated in increments of 90 degrees.

The first block 22 defines a cylindrical bore 76 which is circular in cross section and has a larger diameter than the bore 28. A piston 78 is attached to a portion of the adapter 30 which is accommodated within the cylindrical bore 76. Two pressure chambers 80, 82 are formed on front and rear sides of the piston 78, so that the piston 78 is fluid-tightly, axially movably fitted in the cylindrical bore 76. The pressure chamber 80 is connected to a reservoir (not shown), while the chamber 82 is connected to a pump via a solenoid-operated control valve (not shown). When a hydraulic pressure is supplied to the chamber 82, the piston 78 is advanced toward the end wall of the first block 22 defining the one chamber 80. At the same time, the pressed engagement between the large-diameter portion 36 of the adapter 30 and the corresponding portion 38 of the bore 28 is released, whereby the recessed portions 64 are moved away from the positioning pins 60. Thus, the adapter 30 is moved to its advanced position (the first position), in which the flange 44 of the adapter 30 is disposed ahead of the pins 60. If the pressure chamber 82 is connected to the reservoir upon operation of the solenoid control valve, the adapter 30 is pulled inward of the bore 28, and restored to its retracted position, by a biasing force of the coned-disc springs 58 indicated above. In the instant embodiment, the coned-disc springs 58, the piston 78 and the other components constitute an axial drive mechanism which operates to move the adapter 30 between its advanced and retracted positions.

On a portion of the adapter 30 accommodated in the first block 22, there is provided a pinion 90 via a one-way clutch 88. The adapter 30 engages the one-way clutch 88, so that the adapter 30 is not rotatable with respect to the clutch 88 and is axially movable with respect thereto. The one-way clutch 88 and the pinion 90 are prevented by a pair of thrust bearings 92 from moving in the axial direction. Therefore, the adapter 30 is axially movable relative to the one-way clutch 88.

The pinion 90 is rotated by a rack cylinder 94 which is installed in the first block 22. The rack cylinder 94 has a rack piston 96 which is axially movably received within a cylinder bore 98. As shown in FIG. 3, the cylinder bore 98 is formed in the first block 22 such that the axis of the bore 98 is perpendicular to the rotating axis of the adapter 30. The rack piston 96 has a rack portion which engages the pinion 90, and is reciprocated by selectively connecting pressure chambers 100, 102 at the opposite ends of the piston 96, to a pump and a reservoir. Therefore, the pinion 90 is rotated in two opposite directions. The rack piston 96 is normally located at a position shown in FIG. 3. When the hydraulic pressure is supplied to the chamber 102, the piston 96 is moved in leftward direction of FIG. 3. The one-way clutch 88 is adapted to transmit to the adapter 30 the rotating movement of the pinion 90 which is caused by this lateral movement of the piston 96 in the leftward direction, and not to transmit the rotating movement in the other direction. The operating stroke of the rack piston 96 is adjusted such that the adapter 30 is rotated by 90 degree at each reciprocation of the piston 96. In the instant embodiment, the one-way clutch 88, the pinion 90, the rack cylinder 94 and other components constitute a drive mechanism for rotating the adapter 30.

Figure 4:
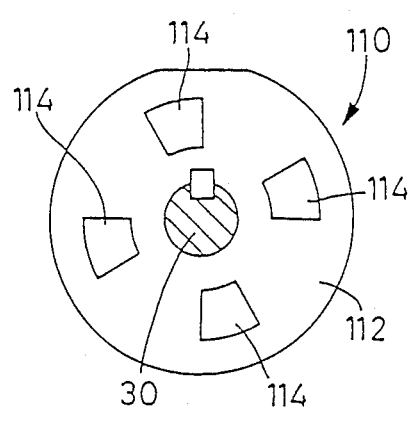
FIG. 4 is a left side elevational view, showing first engaging portions of the above tool indexing device.
Figure 5:
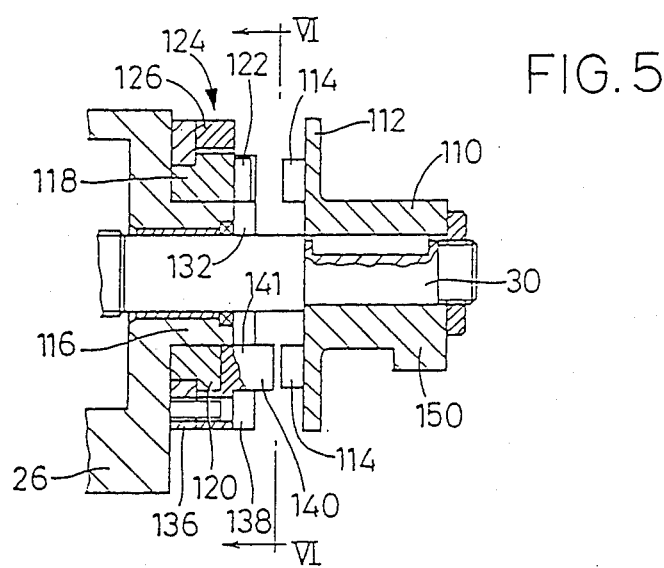
FIG. 5 is a front elevational view showing a stopper mechanism incorporated in the tool indexing device.

The rear end part of the adapter 30 protrudes from the third block 26 of the body 20 so that an engaging member 110 is attached to the protruding end part of the adapter 30. The engaging member 110 is neither rotatable or axially movable, with respect to the adapter 30. A front end portion of the engaging member 110 is provided with a flange 112 which extends radially outward of the member 10, as shown in FIG. 5. The flange 112 is formed with four engaging bosses 114 constituting a first engaging portion, which bosses extend in the forward direction, and are disposed at equally spaced-apart angular positions of a circle whose center is on the rotating axis of the adapter 30, as shown in FIG. 4. Each of the first engaging bosses 14 has a cross sectional shape corresponding to a sector whose central angle with respect to the axis of the adapter 30 is 30 degrees. One of the opposite side surfaces of each engaging boss 114 on the leading side in the rotating direction of the adapter 30 is ground with high accuracy.

The third block 26 of the body 20 has a small-diameter portion 116 having a smaller diameter at its rear end portion. A stopper member 118 is fixed to the small-diameter portion 116 of the third block 26. The stopper member 118 having a cylindrical shape is formed with a flange 120 at its rear end, which flange 120 extends radially outward of the stopper member 118 as shown in FIG. 5. The stopper member 118 further includes a stopper boss 122 which serves as a stopper portion and extends from the rear end surface of the flange 120 toward the engaging member 110. The stopper boss 112 also has a sectorial configuration having the same size as the engaging bosses 114. One of the opposite side surfaces of the stopper boss 112 on the trailing side in the rotating direction of the adapter 30 is ground with high accuracy.

Figure 6:
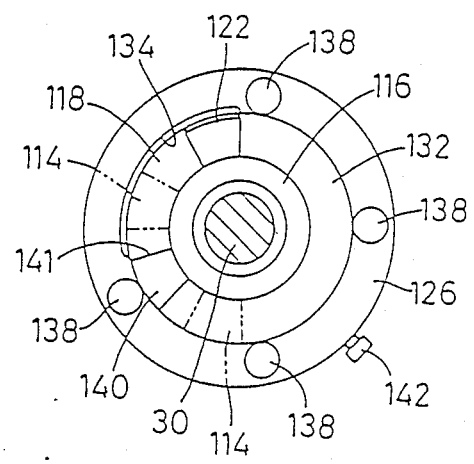
FIG. 6 is a cross sectional view taken along lines VI—VI of FIG. 5.

Between the engaging member 110 and the stopper member 118, there is disposed an intermediate member 124 which is rotatable about the rotating axis of the adapter 30 relative to the engaging member 110 and the stopper member 118. The intermediate member 124 has an annular body 126 whose inner diameter is equal to the diameter of the flange 120 on the stopper member 118. The annular body 126 is formed with a C-shaped embossed portion 132, as shown in FIG. 6. The embossed portion 132 is formed by removing a part of an annular portion corresponding to its central angle of 105 degrees, which annular portion has an inner diameter equal to that of the stopper member 118, an outer diameter slightly smaller than that of the flange 120, and an axial dimension slightly larger than that of the stopper boss 122. There is formed through the thicknesses of the embossed portion 132 and the annular body 126 an arcuate groove 134 which has a circumferential dimension corresponding to the above-indicated central angle of 105 degrees. The annular body 126 of the intermediate member 124 is rotatably fitted on the flange 120 of the stopper member 118 such that the stopper boss 122 of the stopper member 118 is accommodated within the arcuate groove 134. Further, since the intermediate member 124 is fixed by bolts 138 to a spacer 136 interposed between the third block 26 and the flange 120, the intermediate member 124 is not capable of axial movement.

Figure 7:
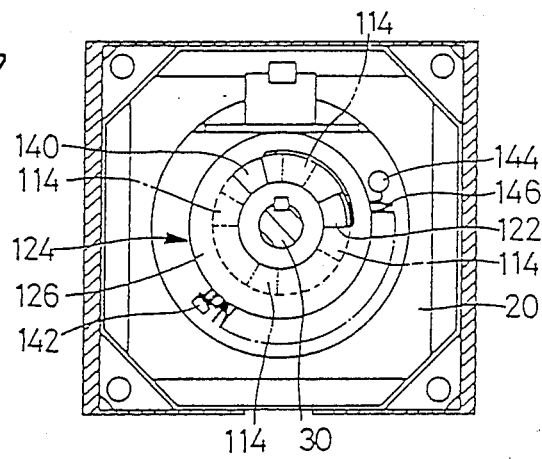
FIGS. 7 and 8 are cross sectional views taken along lines VII—VII and VIII—VIII of FIG. 1, respectively.

On one of the circumferential ends of the embossed portion 132, there is formed a second engaging boss 140 which extends towards the engaging member 110 and which constitutes a second engaging portion. The circumferentially opposite end surfaces of this second engaging boss 140 are precisely ground. The end surface 141 (FIG. 5) of the embossed portion 132 aligned with one of the above end surfaces of the second engaging boss 140 is also ground with high accuracy, and serves as a stopper portion. As illustrated in FIG. 7, there is provided a spring member in the form of a spring 146 between a bolt 142 disposed on the annular body 126 in the radially outward direction and a bolt 144 disposed on the third block 26. The intermediate member 124 is biased by the spring 146 in the direction opposite to the rotating direction of the adapter 30. The stopper boss 122 normally abuts on the other end surface of the embossed portion 132 remote from the second engaging boss 140, as shown in FIG. 6. In this state, the second engaging boss 140 is spaced apart from the stopper boss 122 in the circumferential direction by an angular distance of 75 degrees, (that is, the facing end surfaces of two bosses 122, 140 define an angle of 75 degrees). When the adapter 30 is in its retracted position, the engaging member 110 and the intermediate member 124 are located such that the first engaging bosses 114 and the second engaging boss 140 are spaced apart from each other in the axial direction by a relatively small distance, and such that one of the first engaging bosses 114 is spaced apart from the second engaging boss 140 in the circumferential direction opposite to the rotating direction of the adapter 30 by a distance corresponding to an angle of 15 degrees. Thus, the engaging member 110, the stopper member 118, the intermediate member 124, the spring 146, and other components constitute a stopper mechanism.

Figure 8:
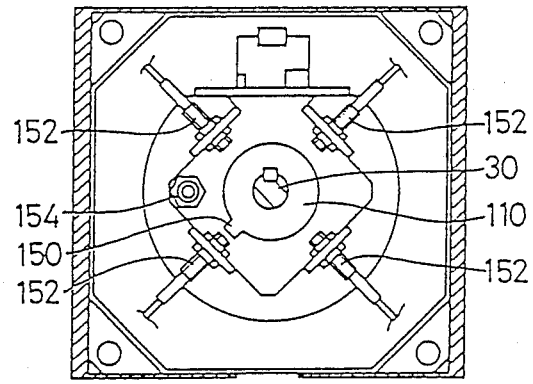

As shown in FIG. 1, the engaging member 110 is provided with a dog 150. The dog 150 is detected by any one of four sensors 152 which are disposed at equally spaced-apart angular positions as shown in FIG. 8. According to this detection, the hydraulic pressure to be supplied to the rack cylinder 94 is controlled. Reference numeral 154 designates a sensor for detecting the retracted position of the adapter 30. Also provided is another sensor (not shown) for detecting the advanced position of the adapter 30. Reference numerals 156, 158 indicate terminal boards (by reference to FIG. 1) which are equipped with input terminals and output terminals for receiving and applying various signals as needed to operate the instant indexing device 10. These terminal boards 156, 158, the sensors 152, 154, and the rear end portion of the adapter 30 are covered by a cover 160.

In the thus constructed tool indexing device 10, the operation for changing one of the cutting tools 74 to another will be described. At first, the piston 78 is advanced by supplying a hydraulic pressure to the pressure chamber 82 so that the adapter 30 can be moved away from the body 20. As the adapter 30 is advanced, the engaging member 110 is advanced, whereby the second engaging boss 140 is positioned between two adjacent first engaging bosses 114 as shown in two-dot chain lines in FIG. 6. At the same time, one of the two first engaging bosses 114 which is on the rear side in the rotating direction of the adapter 30 is located in spaced-apart relation with the second engaging boss 140 by angular distance of 15 degrees.

Figure 10:
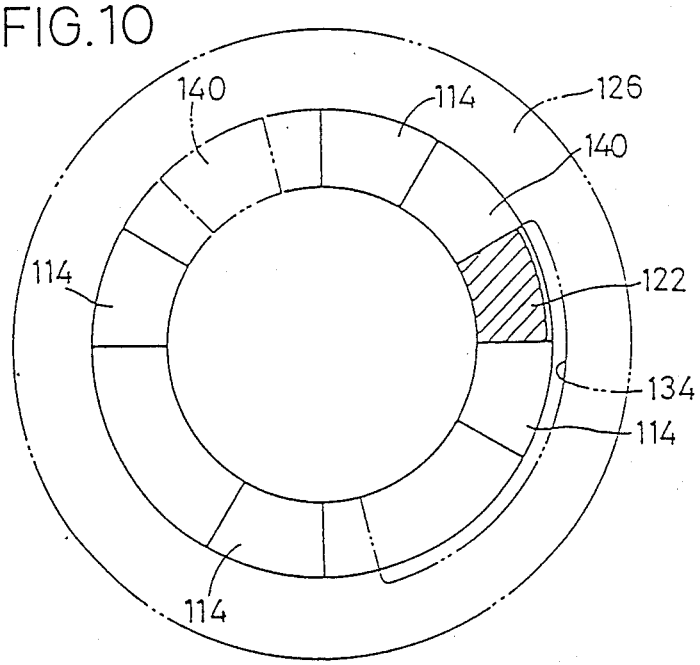
FIG. 10 is an explanatory view indicating a relationship among first engaging bosses, a second engaging boss, and a stopper boss during rotation of an adapter of the tool indexing device.

When the adapter 30 is moved to its advanced position, a hydraulic pressure is supplied to the pressure chamber 102 of the rack cylinder 94, in response to signals which are produced by the sensor(s) for detecting the movement of the adapter 30. Then, the rack piston 96 is moved in the leftward direction in FIG. 3, and therefore the adapter 30 is rotated. Consequently, the cutting tool 74 which has been used for machining is retracted away from the operative position, and then the adjacent cutting tool 74 is brought into the operative position. When the engaging member 110 is rotated by 15 degrees, in concurrence with the rotation of the adapter 30, the first engaging boss 114 abuts on the second engaging boss 140. Further rotation of the adapter 30 causes the intermediate member 124 to rotate with the engaging member 110. Since the arcuate groove 134 is rotated relative to the stopper boss 122 which is accommodated therein, the intermediate member 124 is rotatable with respect to the stopper member 118. Further, the stopper boss 122 is entirely accommodated within the height of the embossed portion 132, whereby an interference between the stopper boss 122 and the first engaging bosses 114 is avoided. Subsequently, the end surface 141 of the embossed portion 132 abuts on the stopper boss 122, whereby the further rotations of the intermediate member 124 and the adapter 30 are prevented. Namely, the adapter 30 is first rotated by 15 degrees until the first engaging boss 114 abuts on the second engaging boss 140, and then rotated by 75 degrees until the end surface 141 abuts on the stopper boss 122. Thus, the adapter 30 is rotated by 90 degrees to the position at which the adapter 30 is precisely stopped. Therefore, the adapter 30 is prevented from rotating beyond the predetermined position due to its inertia, and the cutting tool 74 to be subsequently used for machining is located at the operative position with high accuracy. In the state where the adapter 30 has been rotated by 90 degrees, the stopper boss 122, the second engaging boss 140, and the first engaging bosses 114 are held in their respective positions as indicated in FIG. 10.

After the cutting tools 74 are exchanged in the manner described above, the sensor 152 produces a signal indicating that the adapter 30 has been rotated by 90 degrees. According to the signal, the supply of the hydraulic pressure to the rack piston 96 is cut off, while the pressure chamber 82 is connected to the reservoir. Then, the adapter 30 is retracted into the body 20 by the biasing force of the coned-disc springs 58, and the recessed portions 64 of the adapter 30 are brought into engagement with the positioning pins 60. Consequently, the adapter 30 is fixed to the body 20 while being held in the predetermined position in its circumferential and axial directions. The four recessed portions 64 of the adapter 30 which currently engage the positioning pins 60 are shifted by 90 degrees with respect to the recessed portions 64 which were held in engagement with the pins 60. Since the adapter 30 is rotated exactly by 90 degrees, the above engagement can be made without failure. Further, the engaging member 110 is retracted together with the adapter 30, and thereby the first engaging boss 114 is thus separated from the second engaging boss 140. As a result, the intermediate member 124 is restored by the biasing force of the spring 146, to the position prior to the rotation of the adapter 30 as indicated in two-dot chain lines in FIG. 10, that is, the position in which the end surface 141 thereof is spaced apart from the stopper boss 122 by a circumferential distance corresponding to an angle of 75 degrees. Only the intermediate member 124 is rotated in the direction opposite to the rotating direction of the adapter 30, with respect to the engaging member 110 and the stopper member 118. More specifically, the second engaging boss 140 of the intermediate member 124 is moved relative to the first engaging boss 114 which has moved the boss 140, in the direction opposite to the rotating direction of the adapter 30. The second engaging boss 140 is then located at a position which is spaced by 15 degrees from the first engaging boss 114 which comes next to the above first engaging boss 114. Thus, the first engaging bosses 114 are successively brought into engagement with the second engaging boss 114 each time the adapter 30 is rotated by 90 degrees.

When the sensor 154 detects the adapter 30 which has been brought into its retracted position, a hydraulic pressure is supplied to the pressure chamber 100 of the rack cylinder 94, according to a signal generated by the sensor 154, whereby the rack piston 96 is returned to its original position. At the same time, the pinion 90 is rotated, though the one-way clutch 88 does not transmit this rotating movement of the pinion 90 to the adapter 30.

In the instant tool indexing device 10, the tool holder 70 is fixed to the adapter 30 by the clamper 68 having the corolla-shaped head. In this arrangement, the tool holder 70 is easily attached and removed to and from the adapter 30.

Figure 11:
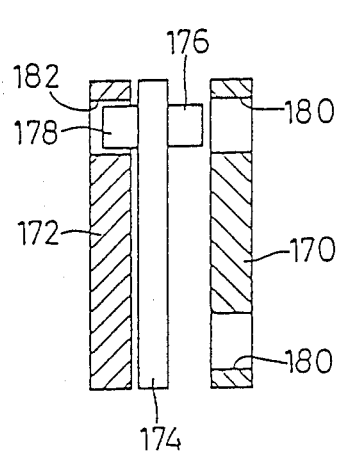
FIG. 11 is a front elevational view illustrating a stopper mechanism according to another embodiment.
Figure 12:
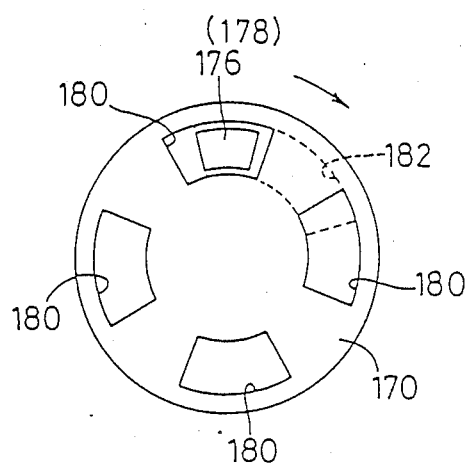
FIG. 12 is a right side elevational view corresponding to FIG. 11.

In the above embodiment, the first engaging portion, the second engaging portion, and the stopper portion of the support member are provided in the form of the bosses 114, 140, and 122, respectively, while the stopper portion of the intermediate member is constituted by the end surface 141 which defines the arcuate groove 134 thereof. However, the first engaging portion and the stopper portion may be constituted by respective grooves, while the second engaging portion and the stopper portion of the intermediate member may be constituted by respective bosses, as illustrated in FIGS. 11 and 12.

In these figures, an intermediate member 174 is disposed between an engaging member 170 fixed to the adapter 30 (not shown) and a stopper member 172 fixed to the third block 26 of the body 20, such that the intermediate member 174 is rotatable relative thereto about the rotating axis of the adapter 30. This intermediate member 174 is formed with an engaging boss 176 as the second engaging portion which extends toward the engaging member 170, and a stopper boss 178 as the stopper portion which extends toward the stopper member 172. These bosses 176 and 178 have a sectorial cross sectional shape whose central angle is 30 degrees, and are positioned opposite to each other. On the other hand, the engaging member 170 and the stopper member 172 are provided with four arcuate grooves 180 as the first engaging portion and one arcuate groove 182 as the stopper portion, respectively. The adjacent two grooves 180 are spaced apart from each other by an angular distance corresponding to the intermittent rotating angle of the adapter 30. Further, the circumferential dimension of each groove 180 is determined such that one end surface of the groove 180 on the trailing side in the rotating direction of the adapter 30 designated by an arrow in FIG. 12, is spaced apart from the engaging boss 176 by a circumferential distance corresponding to an angle of 15 degrees. On the other hand, the groove 182 is formed in the stopper member 172 such that the stopper boss 178 of the intermediate member 174 is spaced apart from one end surface of the groove 182 on the leading side in the rotating direction of the adapter 30, by a circumferential distance corresponding to an angle of 75 degrees, while abutting on the other end surface of the groove 182 on the trailing side in the above direction. The intermediate member 174 is prevented from its axial movement, and is biased by a spring member in the direction opposite to the rotating direction of the adapter 30, as in the preceding embodiment. Therefore, the stopper boss 178 is normally held in a position in which the stopper boss 178 abuts on the end surface of the groove 182 on the trailing side in the rotating direction of the adapter 30.

In the instant embodiment, when the adapter 30 is moved into its advanced position, the engaging boss 176 of the intermediate member 174 is kept within the groove 180 of the engaging member 170. In this state, the adapter 30 is rotated by 15 degrees, and then the rear end surface of the groove 180 abuts on the engaging boss 176. The adapter 30 is further rotated together with the intermediate member 74 until the stopper boss 178 abuts on the front end surface of the groove 182 of the stopper member 172. Thus, the adapter 30 is rotated exactly by 90 degrees and stopped at the thus established position. When the adapter 30 is retracted until the stopper boss 176 comes out of the groove 180, the intermediate member 174 is restored by the spring member to its original position in which the stopper boss 178 thereof abuts on the rear end surface of the groove 182.

Figure 13:
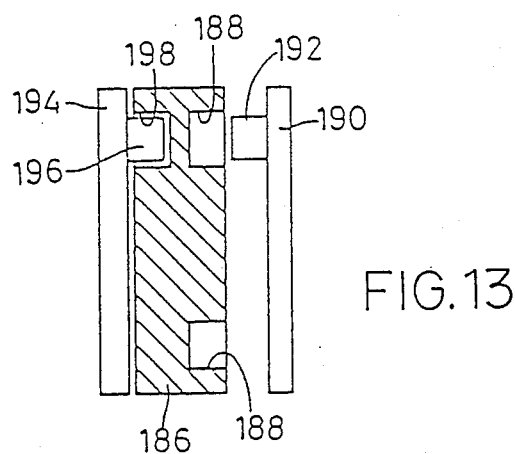
FIG. 13 is a front elevational view illustrating a stopper mechanism according to a further embodiment of the invention.

Further, as shown in FIG. 13, the first engaging portion may be constituted by four recessed portions 188 which are formed in an intermediate member 186, while the second engaging portion may be constituted by one engaging boss 192 which is disposed on an engaging member 190. In the instant embodiment, an engaging boss 196 provided on the stopper member 194 and a recessed portion 198 formed in the intermediate member 186 constitute respective stopper portions thereof. In this arrangement, the engaging boss 192 successively engages the four recessed portions of the intermediate member 186 so as to rotate the intermediate member 186.

It is also possible that the first engaging portion, the second engaging portion and the respective stopper portions of the support member and the intermediate member are all constituted by bosses. While the specific forms of the present invention have been described in detail, the present invention may be embodied in various other forms which use grooves, recessed portions, and bosses, in suitable combinations.

While all of the bosses used in each embodiment described above are adapted to have a sectorial configuration whose central angle is 30 degrees, the bosses used according to the present invention may have other configurations.

Further, while the first engaging portion and the stopper portion of the support member are provided on the engaging member fixed to the adapter 30 and the stopper member fixed to third block 26, respectively, they may be directly provided on the adapter 30 and the third block 26.

In the above embodiment, each of the recessed portions 64 which engage the positioning pins 60 may have a shape corresponding to that of the segment of the pin 60 which protrudes in the opening 46. Alternatively, each recessed portion 64 may have a V-shaped configuration in cross section.

Further, the four positioning pins 60 may be replaced by one positioning pin. It is also possible that the recessed portion is formed in the body, and the pin is provided on the adapter.

In the embodiments described above, the tool indexing device 10 has four cutting tools 74. However, the device 10 may have at least two cutting tools, the number of the tools being selected as needed.

Although the present invention has been described with reference to specific embodiments, the present invention may be embodied with various changes, modifications, and improvements which may occur to those skilled in the art.

We claim:

1. An indexing device including a rotary member supported by a support member such that said rotary member is rotatable about its axis and is axially movable between a first position thereof and a second position thereof, an axial drive mechanism for moving said rotary member in its axial direction, a rotational drive mechanism having a one-way clutch, for rotating said rotary member only in one direction in increments of a predetermined angle, said rotary member being rotated by said rotational drive mechanism, by said predetermined incremental angle, after said rotary member is moved to said first position by said axial drive mechanism, said indexing device comprising:

a stopper mechanism wherein an intermediate member is provided between said support member and said rotary member so that said intermediate member is rotatable about the axis of said rotary member relative to said rotary member and relative to said support member, and is biased by a spring member in a direction opposite to a rotating direction of said rotary member, one of said intermediate member and said rotary member being provided with a plurality of first engaging portions which are equally spaced apart from each other on a circle having a center on the axis of said rotary member, at angular intervals corresponding to said predetermined angle by which said rotary member is rotated, the other of said intermediate member and said rotary member being provided with at least one second engaging portion which engages one of said first engaging portions when said rotary member is placed in said first position, and which is disengaged from said first engaging portions when said rotary member is placed in said second position, said support member and said intermediate member being provided with respective stopper portions, which abut on each other to prevent rotations of said intermediate member and said rotary member when a sum of a rotating angle of said rotary member before engagement of said first engaging portion and said second engaging portion, and a rotating angle of concurrent rotations of said rotary member and said intermediate member as a unit after said engagement, amounts to said predetermined angle by which said rotary member is rotated.

2. An indexing device according to claim 1, further comprising a positioning mechanism for positioning said rotary member at a plurality of equally spaced-apart angular positions about said rotating axis of said rotary member when said rotary member is placed in said retracted position.

3. An indexing device according to claim 2, wherein said positioning mechanism comprises:
 at least one positioning pin which is circular in cross section and is fixed in one of said support member and said rotary member in a direction perpendicular to said rotating axis of said rotary member such that a portion of said at least one positioning pin interferes with the other of said support member and said rotary member, and
 a plurality of recessed portions which are formed in a portion of the other of said support member and said rotary member which portion interferes with said portion of said at least one positioning pin, said recessed portions engaging said portion of said at least one positioning pin when said rotary member is moved to said retracted position at one of said plurality of equally spaced-apart positions.

4. An indexing device according to claim 1, wherein said support member is a body of a tool indexing device, while said rotary member is an adapter which removably supports a tool holder having a plurality of cutting tools at circumferentially spaced-apart positions whose intervals correspond to said predetermined angle by which said rotary member is rotated.

5. An indexing device including:
 a support member;
 a rotary member which is supported by said support member such that said rotary member is rotatable about its rotating axis and is movable along said rotating axis between a retracted position thereof and an advanced position thereof;
 an axial drive mechanism for moving said rotary member between said retracted position and said advanced position;
 a positioning mechanism for positioning said rotary member at a plurality of equally spaced-apart positions about said rotating axis when said rotary member is placed in said retracted position; and
 a rotational drive mechanism for rotating said rotary member by an incremental angle corresponding to angular intervals of said equally spaced-apart positions, when said rotary member is placed in said advanced position,
 said indexing device characterized in that said positioning mechanism comprises at least one positioning pin which is circular in cross section, and is fixed in one of said support member and said rotary member in a direction perpendicular to said rotating axis of said rotary member such that a portion of said at least one positioning pin interferes with the other of said support member and said rotary member in an axial direction of said rotary member, and a plurality of recessed portions which are formed in a portion of the other of said support member and said rotary member which portion interferes with said portion of said at least one positioning pin in said axial direction of said rotary member, said recessed portions engaging said portion of said at least one positioning pin when said rotary member is moved to said retracted position at one of said plurality of equally spaced-apart positions.

6. An indexing device according to claim 5, functioning as a tool indexing device, wherein said support member is a body of said tool indexing device, and said rotary member is an adapter which removably supports a tool holder having a cutting tool at each one of a plurality of its circumferential positions corresponding to each one of said plurality of angular positions.

* * * * *